United States Patent [19]
Gleim

[11] Patent Number: 5,414,338
[45] Date of Patent: May 9, 1995

[54] METHOD AND APPARATUS FOR SUPPRESSING ELECTRICAL IMPULSE NOISE CREATED BY DC MOTORS

[75] Inventor: Günter Gleim, Villingen, Germany

[73] Assignee: Deutsche Thomson-Brandt GmbH, Villengen-Schwenningen, Germany

[21] Appl. No.: 102,879

[22] Filed: Aug. 6, 1993

[30] Foreign Application Priority Data

Mar. 8, 1991 [DE] Germany .................. 41 07 373.8

[51] Int. Cl.[6] .............................................. G05B 11/14
[52] U.S. Cl. ............................... 318/562; 318/439; 318/629; 361/111
[58] Field of Search ............. 318/562, 567, 439, 629; 361/76, 85, 86, 88, 91, 111

[56] References Cited

U.S. PATENT DOCUMENTS

| | | | |
|---|---|---|---|
| 3,676,598 | 7/1972 | Kurth | 318/562 |
| 4,200,925 | 4/1980 | Cushman | 318/562 |
| 5,194,790 | 3/1993 | Niimi | 318/567 |

FOREIGN PATENT DOCUMENTS

0316077 5/1989 European Pat. Off.
2188801 10/1987 United Kingdom.

OTHER PUBLICATIONS

"Motor Control Application Manual", Jan. 1987, pp. 640, 641.
"Operating Modes of the Brushless DC Motor with a 120° Inverter", by S. D. Sudhoff, IEEE Transactions on Energy Conversion, vol. 5, No. 3 Sep. 1990, pp. 558–564.

Primary Examiner—William M. Shoop, Jr.
Assistant Examiner—Brian Sircus
Attorney, Agent, or Firm—Joseph S. Tripoli; Eric P. Herrmann; Ronald H. Kurdyla

[57] ABSTRACT

In a multi-winding motor of the type which develops switching spikes from respective drive signals, separate interference suppression apparatus is not provided for each motor winding to be triggered, but rather interference suppression circuitry is shared between respective winding drive signal paths. In a first arrangement, a single resistor-capacitor impulse suppression network is commutated between all motor winding connections in predetermined phase relation with the application of drive currents to the respective windings. In a further arrangement, a single impulse suppression circuit is used to cyclically couple the respective low power motor trigger signals to the respective high power winding drive amplifies, which suppression circuit precludes the generation of interference pulses at the interface between the drive circuitry and the motor to be driven.

9 Claims, 7 Drawing Sheets

METHOD AND APPARATUS FOR SUPPRESSING ELECTRICAL IMPULSE NOISE CREATED BY DC MOTORS

This is a continuation of application PCT/EP92/00430, filed 27 Feb. 1992. The invention relates to a method for attenuating interference impulses incident the triggering (driving) of an electric motor and a preferred device suitable for executing the method.

BACKGROUND OF THE INVENTION

It is known, for example, from the DATA SHEET "Three-Phase Brushless DC Motor Driver L6231" published in the SGS data book MOTION CONTROL APPLICATION MANUAL, (January 1987, pages 641 through 647) that for triggering (controlling) multi-winding electric motors its individual windings are provided with current in cyclic fashion.

Triggering signals are usually of such a nature that one current is impressed upon each of the windings in dependence upon the angular position, $\phi$, of a rotor of the electric motor. The current changes direction dependent upon the position $\phi$. Between the time periods during which a corresponding current is being impressed, time periods are provided during which the individual windings are without current. If one designates the state of the first direction of current as $+1$, the second state as $-1$ and the current-less or no-current state as 0, then, in the case of a first example for a trigger signal, the states $+1$, 0, $-1$, 0, $+1$ etc. ensue in cyclic fashion for a particular winding.

Triggering impulses applied to the other windings always exhibit, in dependence upon their number, a phase difference with reference to the position $\phi$ compared to the first triggering signal. They, too, usually exhibit the states $+1$, 0, $-1$, 0, 1 etc. in cyclic fashion.

However, strong interference impulses appear, particularly at transitions between the states $+1$, 0 and $-1$, 0, which impulses must be attenuated.

In the SGS data book cited, on the one hand, suitable combinations of resistors and capacitors, so-called RC elements, have been suggested for interference suppression, which combinations are disposed at the output terminals of the high-power (final) drive stages for the triggering of the motor. Typically these suppression networks are coupled between the power drive stage (may be realized in the form of an integrated circuit) and the motor winding connections. Alternatively, the SGS data book specifies integrators with suitable feedback capacitors as a means for interference suppression, which integrators are located ahead of the drive circuits and may be included at least in part within an integrated circuit.

The foregoing suppression circuits may be realized as part of the triggering circuit. However, if they are realized as part of an integrated circuit they occupy significant active circuit area and undesirably reduce the integration density.

SUMMARY OF THE INVENTION

In accordance with the present invention separate interference suppression apparatus is not provided for each motor winding to be triggered, but rather interference suppression circuitry is shared between respective winding drive signal paths.

In one embodiment of the invention a single resistor-capacitor impulse suppression network is commutated between all motor winding connections in predetermined phase relation with the application of drive currents to the respective windings.

In a further embodiment a single impulse suppression circuit is used to cyclically couple the respective low power motor trigger signals to the respective high power winding drive amplifies, which suppression circuit precludes the generation of interference pulses at the interface between the drive circuitry and the motor to be driven.

DETAILED DESCRIPTION

Before discussing the exemplary embodiments, it should be pointed out that the respective blocks shown in the figures merely serve for a better understanding of the invention. Usually, individual ones or several of these blocks are combined into single circuit units. These may be realized in integrated or hybrid technology or as a program controlled microcomputer or, respectively, as part of a program suitable for its control.

Figure 1A:
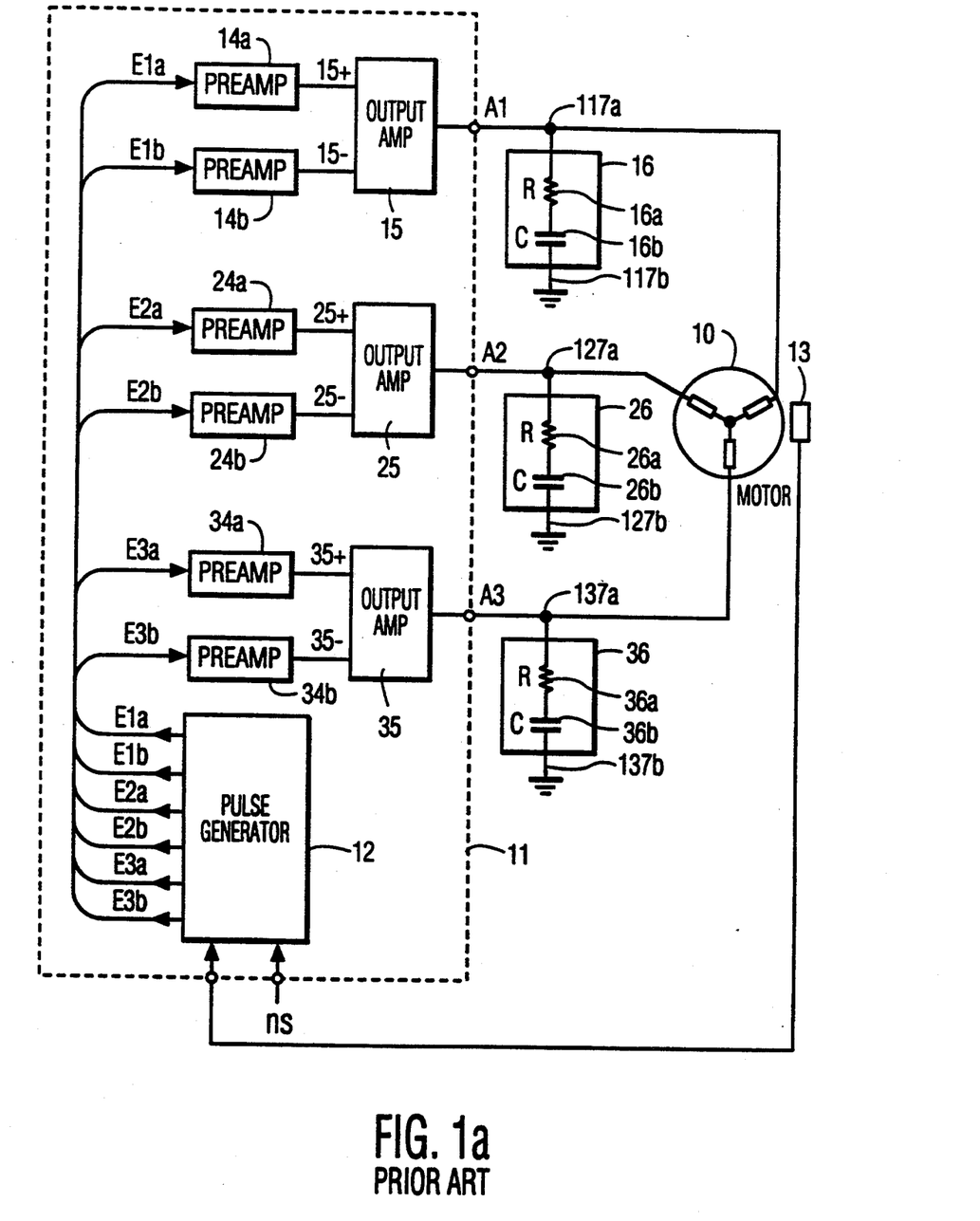
FIGS. 1a and 1b are block diagrams of known devices for triggering three-winding electric motors including circuitry for interference suppression.

Referring to FIG. 1a, a prior art arrangement for triggering a three-winding electromotor is illustrated. A three-winding electromotor, 10, is triggered by a triggering device, 11. This triggering device, 11, contains an electronic control device, 12, which receives signals from a sensor 13. The sensor signals are a measure of the rotational speed and/or position, $\phi$, of the armature of the motor 10. Furthermore, the electronic control device 12 receives triggering signals for determining a desired rotational speed, ns, and sends out triggering signals E1a, E1b, E2a, E2b, E3a, E3b respectively to inputs of preamplification stages 14a, 14b, 24a, 24b, 34a, 34b.

The output of the first preamplification stage 14a is coupled to a positive input, 15+, of a first final amplifier stage 15, and the output of the second preamplification stage 14b is coupled to a negative input, 15−, of the first final amplifier stage 15.

Likewise, the outputs of the preamplification stages 24a, 24b and 34a, 34b are connected to inputs of respective final amplifier or driver stages 25 and 35 respectively.

The first final amplifier stage 15 is coupled to a first winding of the motor 10. In addition, the amplifier output terminal, 117a, is connected to an interference suppression circuit 16, including a series connection of a first resistor 16a and a first capacitor 16b. The free end of the capacitor 16b is coupled to a reference potential at connection point 117b (shown here as ground potential).

The output terminals 127a and 137a of the final amplifier stages 25 and 35 are respectively coupled to second and third windings of the electric motor 10 and to respective second 26 and third 36 interference suppression circuits, respectively including a second resistor 26a and a second capacitor 26b, and a third resistor 36a and a third capacitor 36b.

Figure 3:
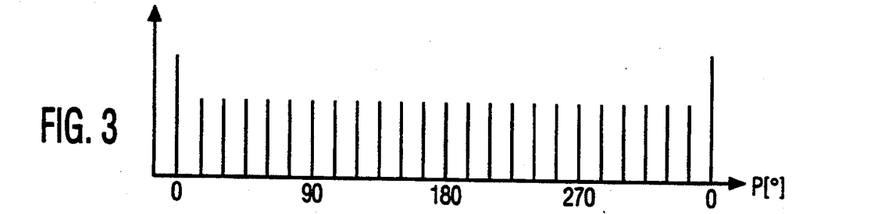
FIG. 3 is a timing chart for determining the phase position $\phi$, of an electric motor.

The operation of the arrangement of FIG. 1a is illustrated with the aid of the FIGS. 3 and 4. FIG. 3 shows the output signal of the sensor 13 in dependence on the position $\phi$ of the motor. Let it be assumed that a special mark is provided at a home position of the motor 10 ($\phi=0$) which mark results in a corresponding output signal. Further markings are included such that the sensor 13 puts out one output impulse every 15 degrees.

The electronic control device 12 which receives the signal from the sensor 13 controls the preamplification stages 14a, 14b, 24a, 24b, and 34a, 34b by means of the signals E1a to E3b in accordance with Table 1 below.

Figure 4A:
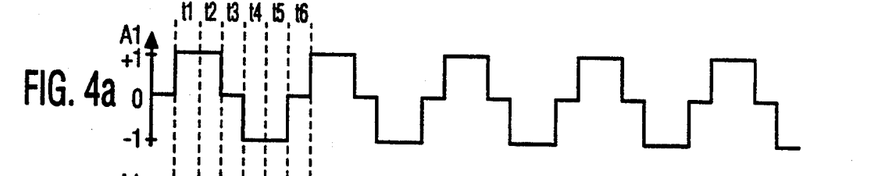
FIGS. 4a, 4b and 4c are time-voltage waveforms of multiphase signals for triggering an electric motor useful in describing the invention.
Figure 4B:
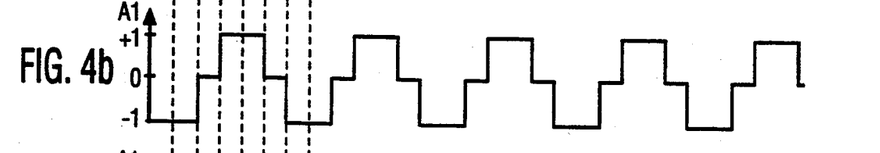
Figure 4C:
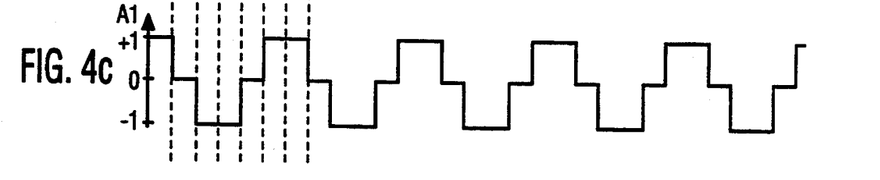

This phasing results in the output signals A1, A2 and A3 illustrated by the waveforms designated FIG. 4a, FIG. 4b and FIG. 4c. The values of the respective winding drive currents are dependent on the desired turning moment (torque) required to be produced by the respective final amplifier stages 15, 25 and 35 respectively. The generation of the illustrated motor triggering signals is known so that it need not be described in more detail at this time.

TABLE I

| (triggering signals at preamplification stage) | | | | | | |
|---|---|---|---|---|---|---|
| | clock cycle | | | | | |
| triggering signal | t1 | t2 | t3 | t4 | t5 | t6 |
| E1a | 1 | 1 | 0 | 0 | 0 | 0 |
| E1b | 0 | 0 | 0 | 1 | 1 | 0 |
| E2a | 0 | 0 | 1 | 1 | 0 | 0 |
| E2b | 1 | 0 | 0 | 0 | 0 | 1 |
| E3a | 0 | 0 | 0 | 0 | 1 | 1 |
| E3b | 0 | 1 | 1 | 0 | 0 | 0 |

Figure 1B:
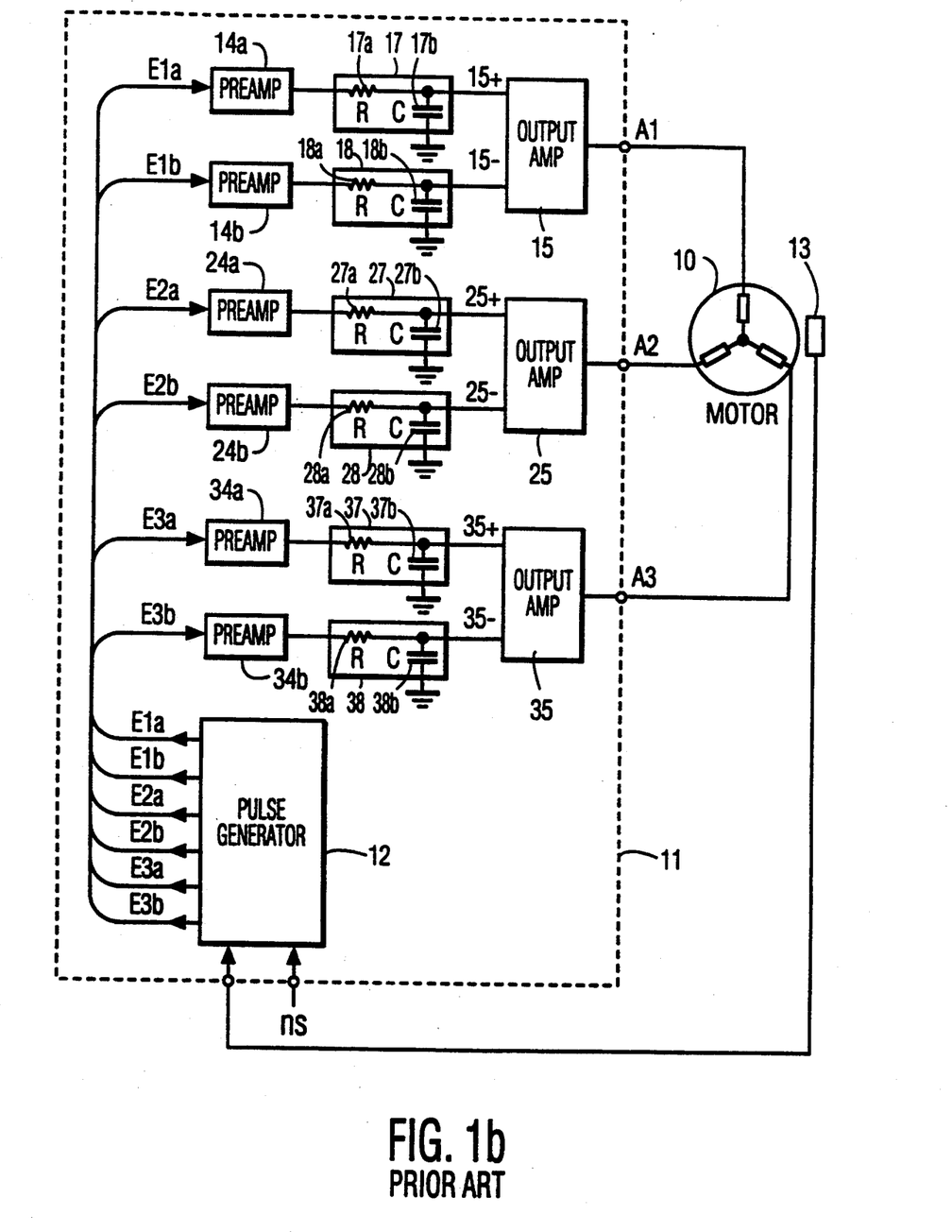
Figure 5:
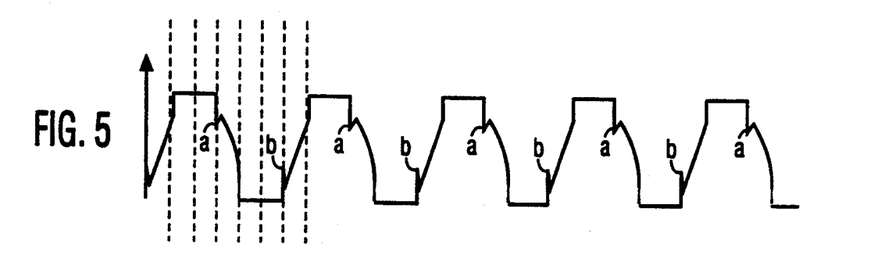
FIG. 5 is a time-voltage waveform illustrating the shape of a voltage applied to a motor winding after interference suppression.

FIG. 5 represents the voltage applied to the first winding of the motor 10 in dependence on the position $\phi$ with a triggering of the aforementioned type. It is clearly apparent that interference peaks "a" or "b" at the +1 to 0 and −1 to 0 transitions of the output signal A1 of the first final amplifier stage 15 are strongly attenuated by the first means for interference suppression 16. In the absence of such attenuation the interference peaks a and b would be significantly greater FIG. 1b shows a second known triggering device for triggering the motor 10. Elements that have the same function as similar ones in FIG. 1a are designated by the same reference numbers, and these are referred to in the following description only insofar as it is essential for the understanding of the invention which is going to be described with the aid of subsequent figures.

The material difference of the triggering circuit according to FIG. 1b compared to the one according to FIG. 1a is that the interference suppression circuits are respectively coupled at the inputs of the final amplifier stages 15, 25, 35.

Thus, an interference suppression circuit 17 is disposed at the positive input 15+ of the final amplifier stage 15 which circuit includes a resistor 17a and a capacitor 17b. The resistor 17a is coupled between the preamplification stage 14a and the interconnection of the capacitor 17b and the positive input 15+ of the first final amplifier stage 15. The second terminal of the capacitor 17b is connected to ground. Similarly, means 18 for interference suppression, formed from the resistor 18a and the capacitor 18b, are coupled with the negative input 15− of the final amplifier stage 15.

This similarly applies to the interference suppression circuits 27, 28, and 37, 38 at the positive inputs 25+, 35+ or, respectively, negative inputs 25−, 35− of the final amplifier stages 25 and 35.

The triggering impulses of the FIG. 1b device are equal to those of FIG. 1a. These shall not be explained in more detail at this point.

Figure 2A:
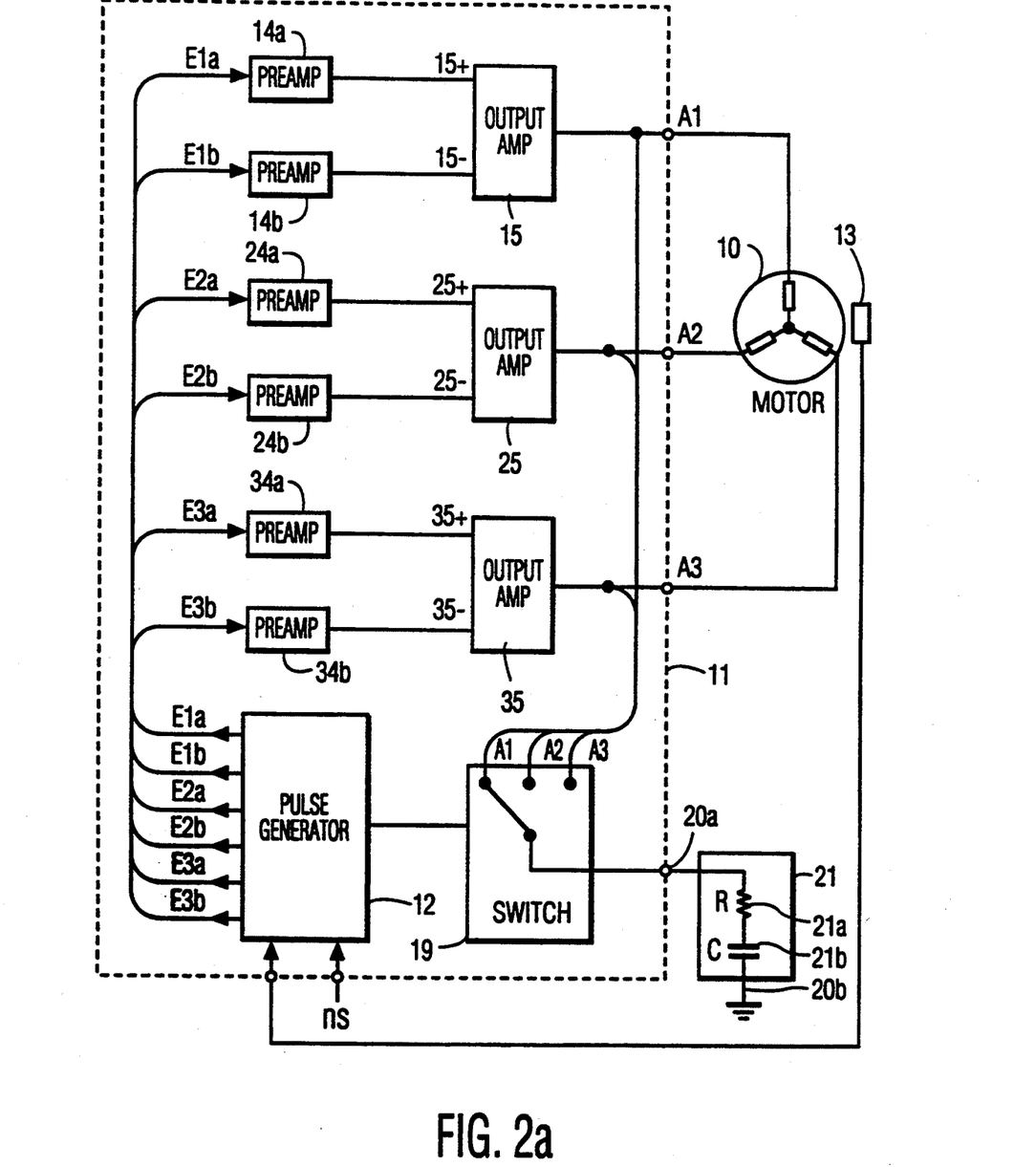
FIGS. 2a and 2b are block diagrams of alternative preferred embodiments of apparatus for attenuating interference impulses according to the invention in a device for triggering a three-winding electric motor.
Figure 2B:
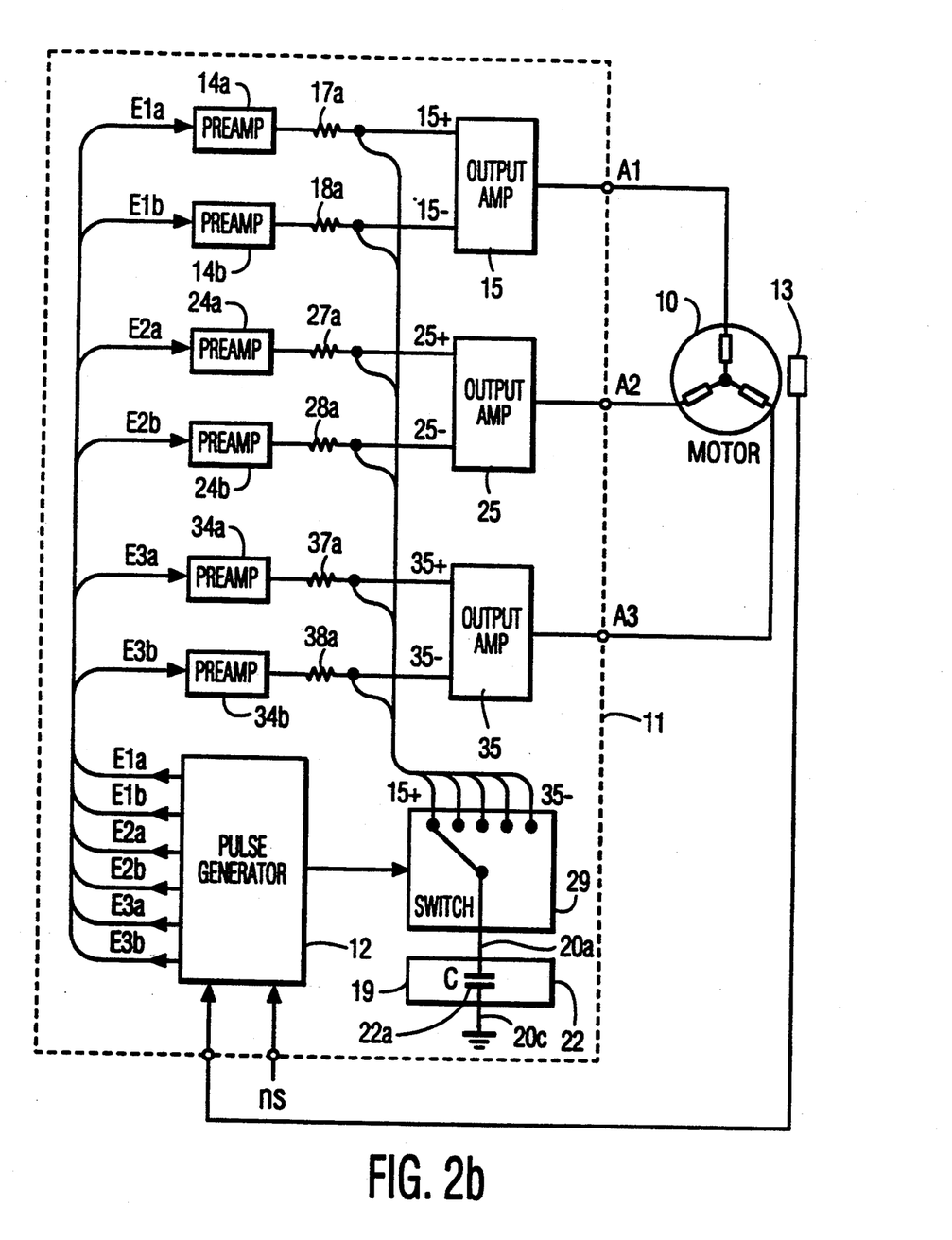

Exemplary preferred embodiments of the invention are represented in FIG. 2a and FIG. 2b. In these figures, elements which have the same functions as in the above named triggering devices of FIG. 1a and FIG. 1b are designated by the same reference numbers, and these shall be referred to in the understanding of the present invention.

The embodiment according to FIG. 2a exhibits a switching-over or commutating device 19 which receives control signals from the electronic control device 12 via a control bus. Output terminals of the final amplifier stages 15, 25, 35, are coupled to respective commutating input terminals of the commutator 19. The common commutation output of the device 19 is connected at point 20a to a single interference suppression circuit 21. The interference suppression circuit 21 includes a series connection of a resistor 21a and a capacitor 21b. They are connected externally, i.e. outside the actual triggering circuit. The free end of the capacitor 21b is coupled to a reference potential at point 20b (shown here as ground potential).

Figures 6A, 6B:
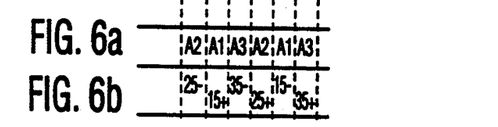
FIGS. 6a and 6b is a sequence chart of signals for a commutator for interference suppression.

The operation of the FIG. 2a embodiment is explained with reference to FIG. 6a. Here, the switching states of the commutator 19 are shown relative to the motor triggering signals A1, A2, A3 available at the outputs of the final amplifier stages 15, 25 or 35 respectively. It is seen from FIG. 6 that the amplifier output exhibiting a transition from +1 to 0 or from −1 to 0 is selectively connected to the interference suppression circuit by the commutator 19 during such transition.

The triggering impulses provided from the electronic control device 12 to the commutator 19 are listed in Table 2.

TABLE 2

| (signal connected to connection 20a) | | | | | | |
|---|---|---|---|---|---|---|
| | clock cycle | | | | | |
| triggering signal | t1 | t2 | t3 | t4 | t5 | t6 |
| A1 | 0 | 1 | 0 | 0 | 1 | 0 |
| A2 | 1 | 0 | 0 | 1 | 0 | 0 |
| A3 | 0 | 0 | 1 | 0 | 0 | 1 |

The "1" values in the matrix indicate which terminal A1, A2 or A3 is coupled to the suppression network during the corresponding time interval $t_j$. It can be seen not only from FIG. 6a but also from Table 2 that during the clock cycle t1 the triggering signal A2 and, therewith, the output of the final amplifier device 25 is coupled to the interference suppression circuit 21; at the time t2 it is the triggering signal A1 and amplifying device 15, and so forth. Hereby, it must be observed that switching occurs only when the triggering signals A1, A2 have reached their desired state.

A second embodiment example of the invention is specified in FIG. 2b. This embodiment includes a switching-over or commutating device 29 which is responsive to triggering impulses provided by the electronic control device 12 via a control input bus. The respective commutation inputs of the commutation device 29 are coupled to the positive inputs 15+, 25+, 35+ and the negative inputs 15−, 25−, 35− of the final amplifier stages 15, 25, 35, and the output of the commutation device 29 is connected to an interference suppression circuit 22 at connection 20a. The interference suppression circuit includes a capacitor 22a coupled between a reference potential and connection 20a.

The operation of the embodiment of FIG. 2b is specified by means of the Table 3 and by means of FIG. 6.

TABLE 3

| (amplifier connected to connection point 20a) | | | | | | |
|---|---|---|---|---|---|---|
| final amplifier input | clock cycle | | | | | |
| | t1 | t2 | t3 | t4 | t5 | t6 |
| 15+ | 0 | 1 | 0 | 0 | 0 | 0 |
| 15− | 0 | 0 | 0 | 0 | 1 | 0 |
| 25+ | 0 | 0 | 0 | 1 | 0 | 0 |
| 35+ | 0 | 0 | 0 | 0 | 0 | 1 |
| 35− | 0 | 0 | 1 | 0 | 0 | 0 |

An essential feature is that the input signal which exhibits a transition of the corresponding motor triggering signal from −1 to 0 or from +1 to 0 is connected to the interference suppression circuit 22.

At the clock cycle to the negative input of the final amplifier stage 25 is coupled to the connection 20a and, thus to the capacitor 22a. At the clock cycle t2 the positive input of the final amplifier stage 15 is connected to the capacitor 22a, and so forth.

It should be observed that the switching occurs only when the signals have reached their desired final value.

It should be noted that in variations of the embodiment according to FIG. 2a, the interference suppression circuitry may be realized as part of the (integrated) triggering circuit. Moreover, it is conceivable that with variations of the embodiment of FIG. 2b the element 22 may be switched externally.

Figure 7A:
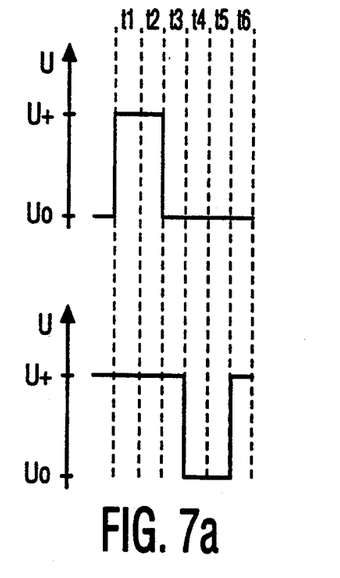
FIG. 7a is a time-voltage waveform of respective triggering signals applied to a push pull driver stage illustrated in FIG. 7b.
Figure 7B:
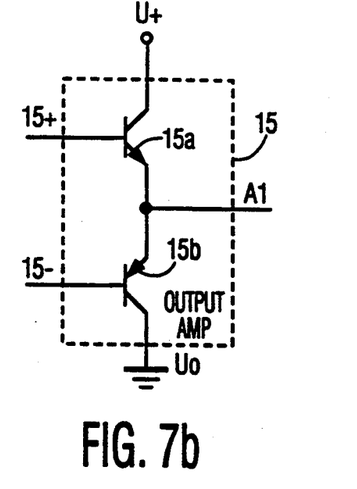
FIG. 7b is a schematic diagram of an amplifier stage suitable for providing winding drive signals.

FIG. 7b shows a schematic of a symbolic representation of a typical implementation of the first final amplifier stage 15. This stage contains a transistor output stage, consisting of an npn transistor 15a and a pnp transistor 15b.

The collector of npn transistor 15a is connected with a positive supply voltage U+ which, for example, forms the positive operating voltage of the system, The base of the npn transistor 15a is coupled, directly or indirectly, to the positive input 15+, and the emitter is coupled to the output from which the motor triggering signal A1 is applied. Also connected to this point is the emitter of the pnp transistor 15b, the base of which is connected, directly or indirectly, to the negative input 15−. The collector of the transistor 15b is coupled to a voltage Uo the value of which is more negative than that of the voltage U+, for example, the voltage of the ground connection of the system.

Triggering signals for the final amplifier stage 15 of FIG. 7b are represented in FIG. 7a. In order that the motor triggering signal A1, during the clock cycles t1-t6, exhibits the shape shown in FIG. 4a, during the clock cycles t1 and t2 the voltage U+ is applied to the positive input 15+ and during the clock cycles t3-t6 the voltage Uo. During the clock cycles t1-t3, and t6 the voltage U+ is applied to the negative input 15−, and during the clock cycles t4 and t5 the voltage Uo is applied to the 15− input terminal. In other words, whenever the motor triggering signal A1 exhibits the state +1 a positive voltage is applied to both inputs 15+, 15− which voltage in this example is equal to U+. As a consequence the npn transistor 15a conducts and the pnp transistor 15b is disabled.

For the state −1 of the signal A1 a negative voltage with respect to U+ is applied not only to the positive input 15+ but also to the negative input 15− which voltage in this example is equal to Uo. As a consequence, the transistor 15b conducts while the transistor 15a is disabled.

For the state "0" of the signal, both transistors 15a, 15b are disabled or non-conducting. This is achieved by applying a negative voltage Uo to the positive input 15+ and applying a positive voltage U+ to the negative input 15−.

It should be pointed out that triggering of the final amplifier stages 25, 35 according to what has just been described happen in accordance with FIG. 4b or, respectively, FIG. 4c.

In a realization of the final amplifier stages 15, 25, 35 with push pull amplifiers having two separate input terminals and input signals as illustrated according to FIG. 7 variations in the commutation apparatus are necessary to accommodate the transitions of the two input signals if the interference suppression circuit is applied to the input of the final stages 15, 25, 35. These variations are illustrated in FIGS. 8 and 9.

Figure 8:
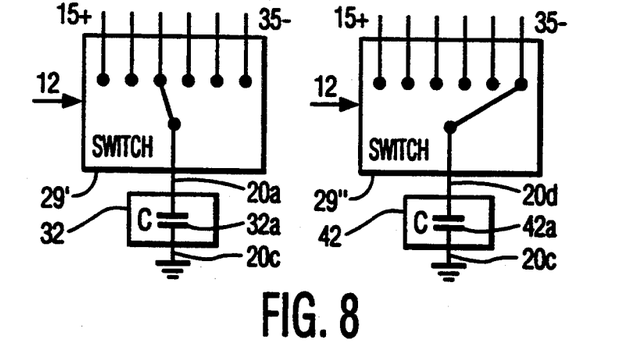
FIGS. 8, 9 and 10 are schematic diagrams of preferred variations of the exemplary embodiment illustrated in FIG. 2 for final amplifier stages shown in FIG. 7b.
Figure 9:
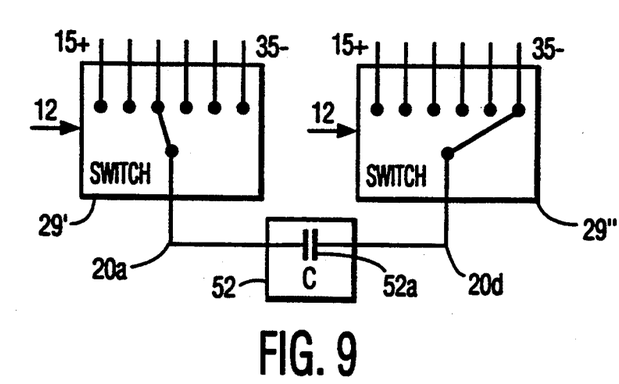

Two interference suppression circuits are utilized to accommodate the two input signals to the final amplifiers in the FIG. 8 alternative. In FIG. 8 only the interference suppression and commutation circuits are illustrated. FIG. 8 shows first and second commutation devices 29' and 29''. Inputs of the commutation devices 29', 29'' are connected in parallel to the input connections of the final amplifiers 15, 25, 35 in similar manner as illustrated in FIG. 2b. The output of the first commutation device 29' is coupled to a first interference suppression circuit, 32, (capacitor 32a) at connection 20a. A second terminal of the interference circuit 32 is coupled to a reference potential 20c. The output of the second commutation device 29'' is coupled to a second interference suppression circuit, 42, (capacitor 42a) at connection 20d. A second terminal of the interference circuit 42 is also coupled to the reference potential 20c.

The essential feature necessary for controlling the commutation devices 29', 29'' is that not only the particular inputs of the final amplifier stages 15, 25, 35 which exhibit a transition from a state in which a current is being impressed (+1, −1) to a current-less state (O), but also those inputs which exhibit a transition from 0 to +1 or from 0 to −1, are coupled with the interference suppression means 32, 42. This is achieved by means of suitable triggering signals provided from the electronic control device 12 to the commutation devices 29' or 29" respectively.

Table 4 illustrates one sequence that the input connections of the commutation circuits (and thereby the respective amplifier input terminals) are coupled to the respective interference suppression circuits. In accordance with this sequence, during the clock cycle t1, the input 25—, the input signal of which exhibits a transition from Uo to U+, is coupled via the commutation device 29' with the capacitor 32a, and the input 35—, the input signal of which exhibits a transition from U+ to Uo, is coupled via the commutation device 29" with the capacitor 42a. During time t2, input 15+ is coupled via commutation device 29' with capacitor 32a, and input 25+ is coupled via commutation device 29" with capacitor 42a, and so forth.

TABLE 4

| commutator. | clock cycle | | | | | |
|---|---|---|---|---|---|---|
| | t1 | t2 | t3 | t4 | t5 | t6 |
| 29' | 25— | 15+ | 35— | 25+ | 15— | 35+ |
| 29" | 35— | 25+ | 15— | 35+ | 25— | 15+ |

It is necessary that the capacitors 32a, 42a or, respectively, the interference suppression means 32, 42 in general are coupled with the forenamed inputs during the corresponding transitions and that the capacitors 32a, 42a are always reverse charged by the input signals in such a way that voltage jumps are avoided.

Consider, for example, the capacitor 32a is positively charged (U+) after the transition of the clock cycle t1. The subsequent transition of the input signal of input 15+ is from U+ to Uo, the then following transition of the input signal of input 35— is from Uo to U+, and so forth. As long as the capacitor is sequentially coupled to an input exhibiting a potential equal to the potential currently exhibited by the capacitor, a jump in the voltage is always avoided. Of course, the same applies to the switching of the commutating device 29".

The next variation, which is illustrated in FIG. 9 utilizes commutation devices 29', 29" having their respective input connections coupled in parallel to the input terminals of the final amplifier stages as with the FIG. 8 arrangement. In this instance, however, an interference suppression circuit 52, (here comprising a capacitor 52a) is coupled between the respective output terminals of the commutation circuits 29' and 29".

With this variation the particular inputs of the final amplifier stages 15, 25, 35 are connected to the third interference suppression means 52 as they exhibit transitions from 0 to +1, 0 to −1, +1 to 0 or from −1 to 0.

The triggering of the commutation devices 29', 29" is provided by the electronic control device 12 also according to the sequence illustrated in Table 4.

It should be pointed out that versions of the variations of FIG. 7 or, respectively, FIG. 8 can also be connected with outputs of the final amplifier stages and triggered accordingly.

It should be mentioned that the symbolic representation of the circuits 21 and 22 for interference suppression and of the interference suppression circuits 32, 42, 52 does not limit their construction. The forenamed circuits may contain, instead of the components 21a, 21b, 22a, other suitable components known to one skilled in the circuit arts. For example integration circuitry may be substituted for capacitors.

Figure 10:
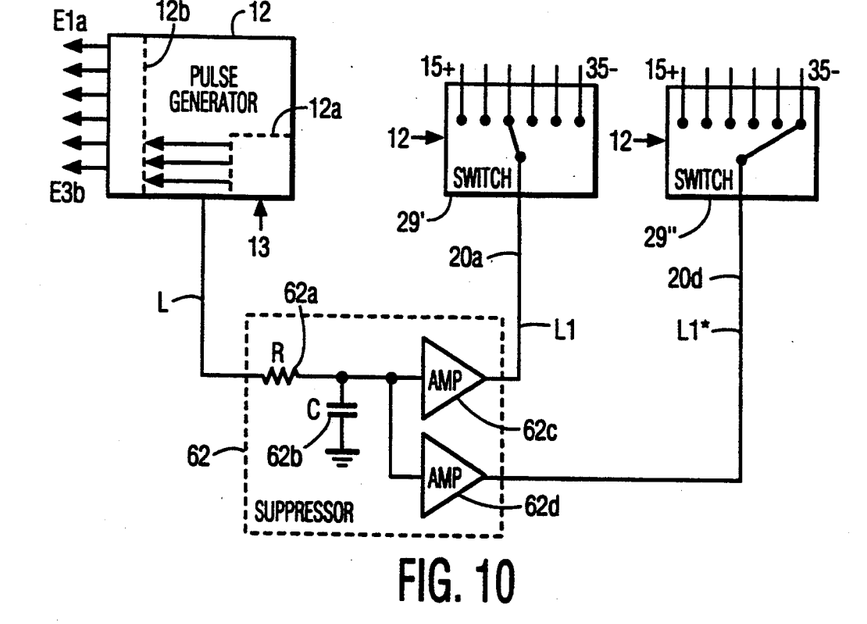

FIG. 10 illustrates a further embodiment and FIG. 11 includes a timing diagram useful in describing its operation. Alphanumeric characters designating features of the FIG. 10 arrangement which are similar to such characters in FIGS. 1, 2, 7, 8 and 9 are intended to relate to similar features.

FIG. 10 includes an active interference suppression circuit 62 containing a resistor 62a, one connection of which receives a signal L from the control device 12 and a second connection of which is connected to a first connection of a capacitor 62b the second connection of which is connected to ground. The second connection of the resistor 62a is connected to an input terminal of an amplifier stage 62e and the input of an inverter stage 62d. The output of the amplifier stage 62c couples a first interference suppression signal L1 to the connection point 20a of the commutation device 29', and the output of the inverter stage couples a second interference suppression signal L1* to the terminal 20d of the commutation device 29".

The signal L which is provided from the control device 12 to the active interference suppression circuit 62 is derived from the position of the motor 10 and may be acquired from a signal, for example, the "least significant bit" (LSB) sent out by a counter 12a. The counter 12a, responsive to signal provided by the sensor 13 provides binary count values to a decoder 12b which generates the triggering signals E1a, . . . E3b.

Figure 11A:
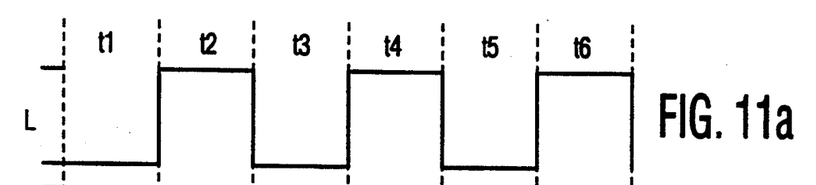
FIG. 11 is a time-voltage waveform of triggering signals for the variation according to FIG. 10.
Figure 11B:
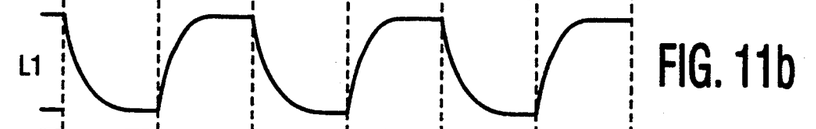
Figure 11C:
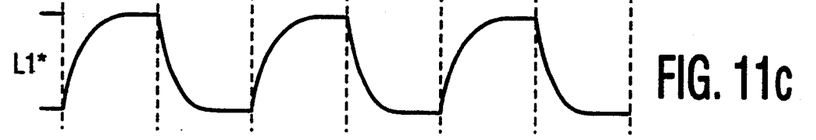

The waveforms of the signals L, L1, L1* are represented in FIG. 11a, b and c respectively. The triggering of the commutation devices 29' and 29" by means of triggering signals from the control device 12 is in accordance with the sequence listed in Table 4.

The signal L alternates between a high state, corresponding to 1, to a low state, corresponding to 0 or, respectively, vice versa in alternate clock cycles t1, t2, . . . etc.. By virtue of the RC network, consisting of the resistor (62a) and the capacitor 62b a voltage is provided to the inputs of the stages 62c, 62d which develop the drive output signals L1 or L1* with interference suppressed, as represented by the waveforms a and b in FIG. 11 respectively.

During the clock cycle t1, after the signal L1 has acquired the voltage value Uo, L1 is coupled via the commutation device 29' to the input 25—. At the beginning of the cycle t2 the input signal applied to this input exhibits a transition from Uo to U+ which is correspondingly smoothed as shown by the signal L1.

During the cycle t1 the interference suppression signal L1* is coupled via the commutation' device 29" with the input 35— whereby the corresponding signal which exhibits a transition from Uo to U+ at the beginning of t2 is flattened accordingly.

During the subsequent clock cycles t2, t3, . . . the triggering of the commutation devices 29', 29" occurs according to Table 4. Hereby, the essential feature is that the particular one of the inputs 15+, . . . , 35— is always connected to one of the interference suppression signals L1, L1* at a time when its input signal exhibits a transition (Uo−U+).

The amplifiers 62c and 62d exhibit relatively low output impedance relative to the resistors 17a, 17b, 27a, 27b, 37a etc. or the output impedance of the amplifiers 14, 24 and 34. As a consequence the output signals provided by the amplifiers 62c and 62d override the output trigger signals provided by the amplifiers 14, 24 and 34. Thus the waveshape of the signal applied to the input to the respective final stage conforms to the waveshape of the signals provided by the amplifiers 62c and 62d when they are coupled by the commutator to a particular final amplifier stage. The output signals of the final amplifier stages 15, 25 and 35 follow the waveform of their respective input signals. Since the respective input signals of the amplifiers 15, 25 and 35 are sequentially conditioned by the signals L1 and L1* to not exhibit abrupt transitions, interference is substantially suppressed.

In a variation of this embodiment the active interference suppression means 62 can be designed as a block which executes the same function with other components, such as, for example, digital-to-analog converters, etc. These can replace, at least in part, the function of the RC network, consisting of the resistor 62a and the capacitor 62b or also of the amplifier stages 62c, 62.

Moreover, it is conceivable that the signal L output from the control device 12 already exhibits a flattened shape, which can be provided through suitable means (RC network, digital-to-analog converter, . . . ) within the control device, so that this signal L can be applied directly to the amplifier stage 62c and the inverter stage 62d.

Further embodiments may include at least one of the following variations:

There may be more than three final amplifier stages (output stages) provided so that motors with more than three windings or several motors can be triggered. In this case a commutator for interference suppression must switch accordingly and possibly require a plurality of such circuits.

Instead of an electric motor with a configuration as illustrated in the drawing, several multi-winding electric motors with which, for example, the individual windings are connected in series, or single-winding electromotors may be triggered.

The electronic control device 12 may be replaced by other suitable control units which operate, for example, mechanically, optically and/or electrically.

The sensor 13 may be replaced by other suitable sensors for sensing the rotational speed n and/or the position $\phi$. These sensors may be designed mechanically, electrically and/or magnetically, for example, as Hall sensor or through the windings of the motor 10 to be triggered. The signals output are then to be processed accordingly.

Therewith, the invention in its entirety introduces a system, comprising a method and a device suitable for carrying out the method, for triggering an electric motor which allows a reduction of the number of circuits for interference suppression, without reducing the attenuation of interference impulses.

The reduction of the number of circuits for interference suppression is achieved in that in dependence upon the triggering signal of the motor, a reduced number of circuits for interference suppression is switched in such a way that with transitions in which interference impulses are caused, the circuits for interference suppression are switched correspondingly, at least in part.

Through the reduction of the forenamed means for interference suppression the invention particularly bears the advantage that the integration density can be increased or, in case of external wiring, the number of external connections can be reduced.

What is claimed is:

1. Apparatus for driving a motor having a plurality of windings, which windings are respectively energized with a plurality of similar drive signals each having a different phase, said apparatus comprising:

a drive signal generator having a plurality of output terminals for providing said plurality of drive signals;

a plurality of amplifier circuits coupled to each of said drive signals respectively, said amplifier circuits providing motor drive signals at respective amplifier output terminals for application to each of said plurality of windings;

interference suppression means for extending signal transitions; and switching means for switching said interference suppression means between respective amplifiers to reduce interference produced by said motor drive signals.

2. The apparatus set forth in claim 1 wherein said switching means cyclically couples said interference suppression means to said respective amplifier output terminals.

3. The apparatus set forth in claim 1 wherein said switching means cyclically couples the interference suppression means to respective input terminals of said plurality of amplifiers.

4. The apparatus set forth in claim 1 wherein said interference suppression means comprises a capacitor having one plate connected to a point of reference potential and a second plate coupled to said switching means.

5. The apparatus set forth in claim 1 wherein said interference suppression means comprises a band limited intermediate amplifier and said switching means cyclically couples said intermediate amplifier between each of the output terminals of said drive signal generator and respective input terminals of each of said amplifiers.

6. The apparatus set forth in claim 1 wherein respective said drive signals cyclically provide periods of current of a first polarity, no current, current of a second polarity, no current, and said switching means selectively couples said interference suppression means to each of said amplifiers passing a drive signal exhibiting a predetermined change of state.

7. The apparatus set forth in claim 1 wherein respective said drive signals cyclically provide periods of current of a first polarity, no current, current of a second polarity, no current, and said switching means selectively couples said interference suppression means to each of said amplifiers passing a drive signal exhibiting a no current state.

8. A method of suppressing interference generated by driving a motor with a plurality of motor drive signals of differing phase applied to a like plurality of motor windings via a plurality of drive signal paths by cyclically coupling an interference suppression means to said plurality of drive signal paths in a predetermined phase relationship with said plurality of drive signals.

9. The method set forth in claim 8 wherein the process of cyclically coupling an interference suppression means to said plurality of drive signal paths comprises cyclically forming a resistive-capacitive network in respective drive signal paths.

* * * * *